United States Patent [19]

Khvalovsky et al.

[11] 4,109,304
[45] Aug. 22, 1978

[54] DEVICE FOR COHERENT LIGHTING OF OBJECTS

[76] Inventors: Vladimir Vasilievich Khvalovsky, ulitsa S. Kovalevskoi, 13, korpus 3, kv. 79; Sergei Nikolaevich Natarovsky, Lermontovsky prospekt, 8/10 kv. 17, both of Leningrad; Valentin Iosifovich Nalivaiko, Akademichesky gorodok, ulitsa Shkolnaya, 5, kv. 48, Moskovskaya oblast, Podolsky raion; Vladimir Lvovich Vorontsov, ulitsa Kustodieva, 20, korpus 1, kv. 39, Leningrad, all of U.S.S.R.

[21] Appl. No.: 660,382

[22] Filed: Feb. 23, 1976

[51] Int. Cl.² .......................................... F21V 11/00
[52] U.S. Cl. .................................... 362/259; 350/167; 331/94.5 R

[58] Field of Search ................. 240/1 R, 1 M, 2 MT, 240/41 R; 350/167; 331/94.5 R, 94.5 D, DIG. 1

[56] References Cited

U.S. PATENT DOCUMENTS

| | | | |
|---|---|---|---|
| 3,122,602 | 2/1964 | Page | 240/1 M |
| 3,541,323 | 11/1970 | Stewart et al. | 350/167 |

*Primary Examiner*—Russell E. Adams
*Attorney, Agent, or Firm*—Steinberg & Blake

[57] ABSTRACT

A device for coherent lighting of objects, wherein across the path of a coherent light beam of parallel rays emitted by a laser, there is arranged a means to transform said coherent light beam of parallel rays into an infinite number of parallel-ray light beams travelling at an angle to one another, whereby there is produced an effect of light equivalent to that of a spatially extended source of coherent light.

5 Claims, 7 Drawing Figures

DEVICE FOR COHERENT LIGHTING OF OBJECTS

The present invention relates to optical lighting devices and, more particularly, to a device for coherent lighting of objects, which can be used in optical instruments to study non-self-luminous objects in coherent light, as well as in microscopy, phototelegraphic equipment, holography, and projection systems.

It is generally known that the contrast of an object's image produced by any optical system is determined both by the properties of the optical system, including its aberration properties, and by the degree of coherence of said object's illumination. When comparing the contrast of an object to that of the object's image, one resorts to the notion of the transfer function. In the case of coherent lighting for optical systems with good correction of aberration, the transfer function is practically constant at all spatial frequencies. Thus, in the case of coherent lighting, the contrast of an image is similar to that of the object. In the case of incoherent lighting, even for an optical system where the aberration is fully corrected, the transfer function is not constant in magnitude at all frequencies. It should be borne in mind in this connection that the contrast of an image is invariably less than that of the object. When dealing with details of objects having a minimum possible contrast, any reduction in the contrast makes these details disappear from the object's image. It is possible to avoid contrast losses in an image of an object by using coherent lighting from all sides of every point of the object.

However, at present there is no device to provide coherent lighting from all sides of every point of an object.

The known lighting devices, which provide for coherent lighting, employ either an incoherent light source with a point diaphragm, or a laser. Coherent lighting devices with an incoherent light source necessarily comprise a diaphragm with an aperture of an extremely small size which determines the degree of coherence of lighting; the smaller the aperture, the greater the degree of coherence of the lighting.

In a lighting device with an incoherent light source (an incandescent lamp, voltaic arc, gas discharge tube, etc.) and a small-size diaphragm, the point source of coherent light is the aperture of the diaphragm. The small size of the diaphragm aperture accounts for the fact that only a negligibly small portion of the luminous flux emitted by the incoherent light source is used gainfully; this is a great disadvantage from the viewpoint of power consumption.

There are two wide-spread versions of a lighting device with a laser.

In the first embodiment, the coherent light source is a laser. The lighting device also includes a centered focusing optical system. This system makes it possible to vary the width of a coherent light beam emitted by the laser and thus change the size of the lighted area of an object.

According to the second embodiment, the device for coherent lighting of objects only comprises a laser. An object is lighted directly by the coherent light beam emitted by said laser.

The degree of coherence of lighting provided by lighting devices comprising a laser is determined by the properties of the laser and its operating conditions. For example, in the case of a multimode laser, the degree of coherency is lower, as compared to a single-mode laser.

While providing for lighting with maximum coherence, all the foregoing optical devices illuminate an object in such a way that it appears to be illuminated by a point of light, which means that the object is illuminated by a single light wave.

In a lighting device, which only comprises a single-mode laser, the coherent light beam emitted by said laser is a beam of parallel rays. Thus, an object is lighted by one plane light wave, which is equivalent to illuminating the object by a single, infinitely remote point light source. If a focusing optical system is incorporated into the lighting device, the plane light wave is transformed into a spherical wave, so that the object is illuminated by the single spherical wave originating from the back focus of the focusing optical system.

The degree of coherence of lighting is determined, in the final analysis, by the extent to which the light effect of the lighting device resembles that of an ideal point source of light, i.e. a source of light that uses a single light wave. However, none of the devices reviewed above can provide for illumination from all sides of every point of an object, because every point of an object is illuminated from all sides only when light energy is transmitted from every point of the lighting device's exit pupil to every point of the object. If the light waves, which carry this energy, have an equal length and a constant phase difference, the result is coherent lighting of every point of an object from all sides. This means that there is a wave arriving at every point of the object being illuminated. A real object has an infinite number of points; hence, there must be an infinite number of such waves. Each wave is a superposition of an infinite number of light waves originating from every point of the exit pupil of the lighting device and carrying light energy to every point of the object. Physically, this follows from the Helmholtz-Kirchhoff integral theorem with the Kirchhoff and Rayleigh-Sommerfeld boundary conditions.

If there is a point source of light and if only a single light wave leaves the lighting device, it follows that light energy is transmitted to each point of an object only from one point of the incident wave's wavefront. Clearly, it is impossible in this case to illuminate every point of the object from all sides.

Thus, all-round illumination requires a source of light of finite linear dimensions. The existing coherent light sources cannot provide for coherent lighting of every point of an object from all sides, because all these sources are either point sources or equivalent to point sources, which means that they have no linear dimensions.

It is an object of the present invention to provide a device for coherent lighting of objects, whose effect of light would be equivalent to that of a spatially extended coherent light source.

It is another object of the present invention to provide for coherent lighting from all sides of every point of an object of finite dimensions.

It is still another object of the invention to raise the utilization factor of a coherent light source.

The foregoing objects are attained by providing a device for coherent lighting of objects, comprising a laser to emit a coherent light beam of parallel rays, which device includes, according to the invention, a means for converting the coherent light beam of parallel rays emitted by the laser into an infinite number of parallel-ray light beams traveling at an angle to one another, which means is arranged across the path of the light beam emitted by said laser.

It is expedient that the means for converting the coherent light beam of parallel rays emitted by the laser into an infinite number of light beams of parallel rays, travelling at an angle to one another, should be composed of at least two lenses, the angle between the optical axes of said lenses being from 0° to 90°, said lenses making up a lenticular plate.

It is desirable that the lighting device should include a condenser arranged across the path of light beams, downstream of the means for converting the coherent light beam of parallel rays emitted by the laser into an infinite number of light beams of parallel rays, travelling at an angle to one another.

It is preferable that the device should include two coaxial cones with reflecting conical surfaces, said cones being arranged across the path of the light beam, between the laser and the means for converting the coherent light beam of parallel rays emitted by the laser into an infinite number of light beams of parallel rays, travelling at an angle to one another.

It is expedient that the lighting device should include a field lens arranged across the path of light beams, between the means for converting the coherent light beam of parallel rays emitted by the laser into an infinite number of light beams of parallel rays, travelling at an angle to one another, and the condenser.

The proposed device for coherent lighting of objects makes it possible to improve images of low-contrast objects and the photometric characteristics of optical analyzing systems. The device makes it possible to improve the illumination of an object without increasing the aperture of the lighting device; in this respect, the proposed device compares favorably to those which employ incoherent light sources.

A device in accordance with the invention can be installed in any type of microscope, in phototelegraphic apparatus, automatic and semi-automatic optical readers, coherent optical computers, as well as in any instrument, apparatus or set of equipment which requires all-round coherent lighting. The proposed lighting device improves the qualitative and metrological characteristics of apparatus and instruments without changing their basic design features and parameters.

Other objects and advantages of the present invention will become more apparent from the following detailed description of preferred embodiments thereof taken in conjunction with the accompanying drawings, wherein.

Figure 1:
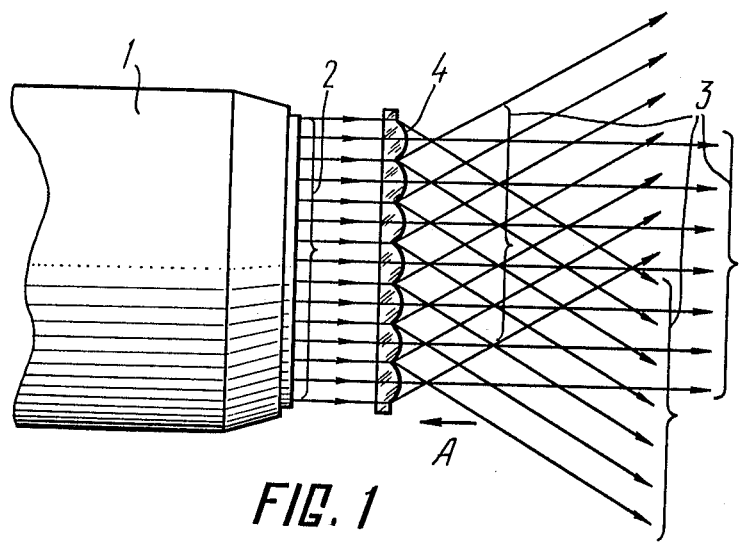
FIG. 1 is a schematic representation of a first embodiment of the device for coherent lighting of objects in accordance with the invention.

Referring now to the attached drawings, the proposed device for coherent lighting of objects comprises a laser 1 (FIG. 1) to emit a coherent light beam 2 of parallel rays. Arranged across the path of the beam 2 is a means for converting the coherent light beam 2 of parallel rays, emitted by the laser 1, into an infinite number of parallel-ray beams 3 which travel at an angle to one another.

This device produces an effect of light equivalent to that of a spatially extended coherent light source.

Said means comprises at least two lenses, the angle between their optical axes being from 0° to 90°, said lenses making up a lenticular screen. The mutual spatial arrangement, as well as shape and number of said lenses are arbitrary. In the embodiment under review, the coherent light beam transforming means comprises a group of identical plano-convex lenses 4 which are decentered relative to one another. Said lenses 4 are immediately adjacent to each other so that the vertices of their convex refracting surfaces lie in one plane. The centers of curvature of said lenses 4 are on one side of said plane; the angle between the optical axes of said lenses 4 is 0°. For the sake of simplicity, it is assumed that the lenses 4 (FIG. 2) are square in shape. The vertices of their convex refracting surfaces are in the nodes of an equilateral, uniformly spaced orthogonal grid. There are 49 lenses 4 in the embodiment under review.

The laser 1 is a continuous He-Ne laser.

Figure 3:
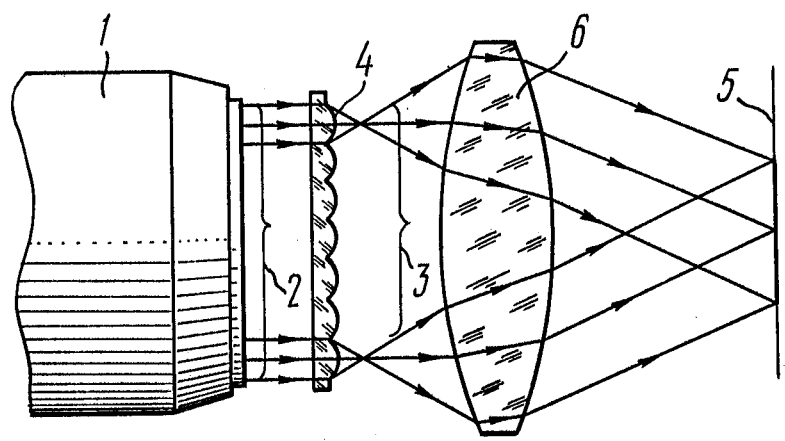
FIG. 3 is a cross-sectional view of the lenticular plate and focusing lens of a second embodiment of the device for coherent lighting of objects in accordance with the invention.

In order to provide for all-round coherent lighting of every point of an object 5 (FIG. 3), the device incorporates along the optical axis of the laser 1 and the light beam transforming means 4 a condenser means arranged across the path of the light beams 3, downstream of the lenticular plate composed of the lenses 4. In the present embodiment, the condenser means is formed by a focusing lens 6 which directs the light in a multiplicity of different directions inwardly toward the optical axis to illuminate the object 5 from a multiplicity of different angles.

Figure 4:
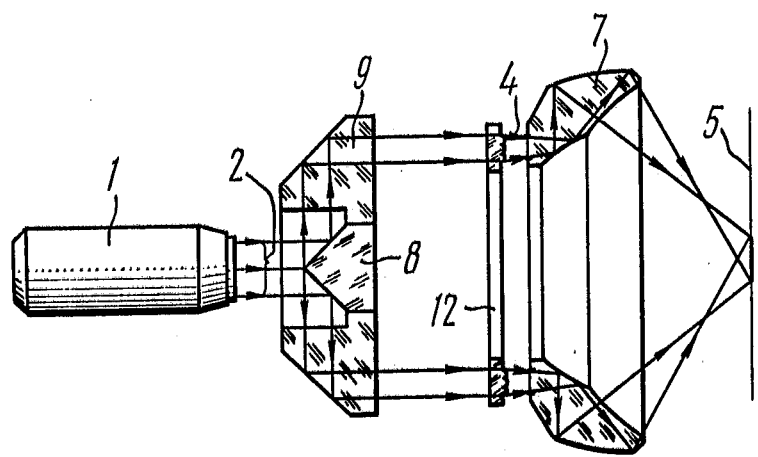
FIG. 4 is a cross-sectional view of the coaxial cones, lenticular plate and cardioid condenser of a third embodiment of the device for coherent lighting of objects in accordance with the invention.
Figure 5:
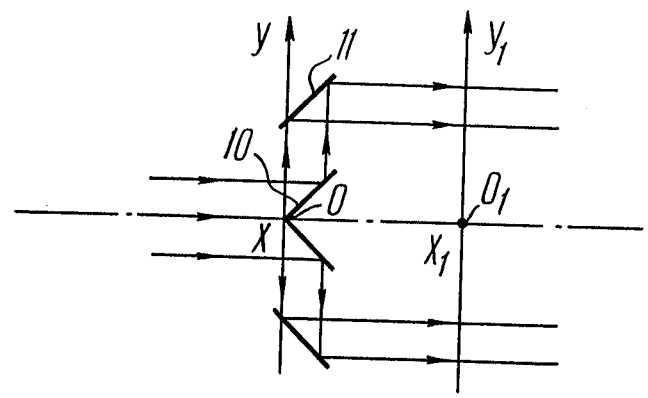
FIG. 5 is a schematic representation of the reflecting surfaces of the coaxial cones of the proposed device with beams travelling in the meridian plane.

FIG. 4 shows an embodiment of the proposed device for coherent lighting of objects, wherein the condenser means is formed by a cardioid condenser 7 having an annular entrance pupil. In order to ensure a fuller utilization of the light energy emitted by the laser 1, between said laser 1 and the lenticular plate, across the path of the light beam 2, there are arranged an inner and an outer reflecting means respectively formed by two coaxial cones 8 and 9 having annular, coaxial reflecting conical surfaces 10 and 11 surrounding and coaxial with the optical axis (FIG. 5).

In the case of an annular pupil, the means for converting the coherent light beam of parallel rays emitted by the laser into an infinite number of beams of parallel rays, travelling at an angle to one another, is similar to the one described above, but said means must have an opening 12 (FIG. 4) whose diameter is determined by the internal diameter of the incident hollow light beam.

The laser 1, cones 8 and 9, opening 12 and cardioid condenser 7 make up a centered system.

Figure 6:
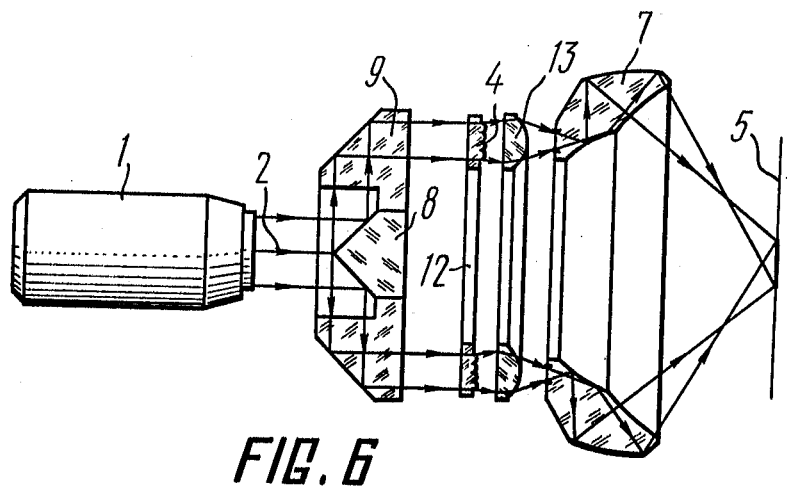
FIG. 6 is a cross-sectional view of the coaxial cones, lenticular plate, field lens and cardioid condenser of a fourth embodiment of the device for coherent lighting of objects in accordance with the invention.
Figure 7:
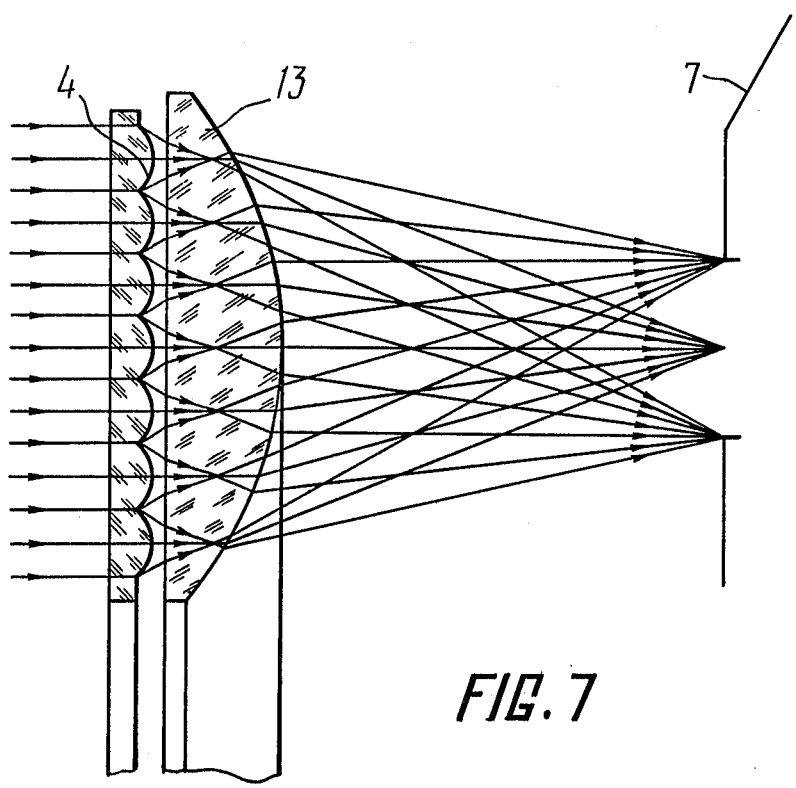
FIG. 7 is a magnified view of a portion of the lenticular plate and collective of FIG. 6 with beams travelling in the meridian plane.

In order to completely fill the annular pupil of the cardioid condenser 7 with all the light beams 3 of parallel rays and avoid cutting off said beams 3 by said annular pupil, across the path of said beams 3, between the lenticular plate and cardioid condenser 7, there is arranged a field lens which is a plano-convex lens 13 (FIG. 6). The convex surface of said lens 13 is toroidal in shape. The selection of the shape of the field lens is determined by the annular pupil of the cardioid condenser 7 and the beam path downstream of the lenticular plate, as shown in FIG. 7.

The proposed device for coherent lighting of objects operates as follows.

Figure 2:
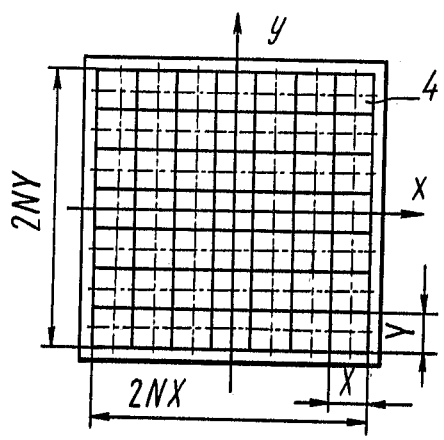
FIG. 2 is a view of the lenticular plate of the proposed device, taken along the arrow A of FIG. 1.

The coherent light beam 2 (FIG. 1) of parallel rays, emitted by the laser 1, is incident on the lenticular plate made up by the lenses 4. The action of the lenticular plate is expressed by the complex function T $(x,y)$.

$$T(x, y) = D(x, y) \cdot T_p(x, y),$$

where D $(x, y)$ is the pupillary function of the lenticular screen.

$$D(x,y) = \sum_{n=-N}^{N} \sum_{m=-M}^{M} \text{rect}(x - nX)\text{rect}(y - mY) =$$

$$= \begin{cases} 0 & |X| = \frac{n}{2} X; \ |y| = \frac{m}{2} Y \ |n| = 1,2,3...N \\ 1 \text{ at the remaining points } |m| = 1,2,3,...M \end{cases}$$

where X and Y are the grid spacing of the lenticular plate along the axes OX and OY (see FIG. 2);

$T_p(x, y)$ is a complex function which describes the effect of in individual lens 4 of the lenticular screen.

$$T_p(x,y) = \exp[-j K/2f(x^2+y^2)].$$

where $K = 2\pi/\lambda$ is the wave number;
$\lambda$ is the wavelength of the monochrome radiation of the laser 1;
$f$ is the focal distance of an individual lens 4 of the lenticular screen.

It is known that the amplitude distribution function of the incident light beam 2 (FIG. 1), i.e. $g_o(x, y)$, is related to the amplitude distribution function of the luminous radiation after the lenticular plate, i.e. $g_f(x_f,y_f)$ by the Fourier transformation to the approximation of Fresnel diffraction. Hence, it can be stated, to an accuracy of the constant phase factor, that $$g_f(x_f,y_f) = \int\!\!\int_{-\infty}^{\infty} g_o(x,y)D(x,y) \exp[-j2\pi(f_x \cdot X + f_y \cdot Y)] \, dx dy$$

where $x_f, y_f$ are Descartes coordinates in the coordinate plane $x_f o_f y_f$ matched with the back focal plane of the lenticular plate;

$f_x, f_y$ are spatial frequencies along the axes OX and OY, respectively, in the coordinate plane XOY corresponding to the first surface, from the viewpoint of the direction of the light beam, of the lenticular plate.

$$f_x = x_f/\lambda f; \ f_y = y_f/\lambda f$$

The Z-axes of all the coordinate systems are matched and extend in the same direction.

It is known that the plane wave equation B $(x, y, z)$ with the direction cosines $\alpha$, $\beta$ and $\gamma$ is expressed as follows:

$$B(x,y,z) = \exp[k(\alpha x + \beta y + \gamma z)],$$

where $$\alpha^2 + \beta^2 + \gamma^2$$

Thus, in the plane $Z = O$, the exponential function $$\exp[-j2\pi(f_x X + f_y Y)]$$

can be regarded as a plane wave with the direction cosines $$\alpha = \lambda f_x; \ \beta = \lambda f_y; \ \gamma = \sqrt{1-\alpha^2-\beta^2}.$$

Let us change the variables. Here is what we have now:

$$g_f\left(\frac{\alpha}{\lambda}, \frac{\beta}{\lambda}\right) =$$

$$\int\!\!\int_{-\infty}^{\infty} g_o(x,y)D(x,y) \exp\left[-j2\pi\left(\frac{\alpha}{\lambda}x + \frac{\beta}{\lambda}y\right)\right] dx dy$$

The function $g_f(\alpha/\lambda, \beta/\lambda)$ may be regarded in this case as the angular spectrum of incident radiation (cf. Introduction to Fourier Optics by Josef W. Goodman. McGraw Hill Book. Co. St. Francisco. New York. St. Louis. Toronto. Sidney. 1968).

This angular spectrum is spatially confined within the limiting frequencies $$\alpha_o/\lambda \text{ and } \beta_o/\lambda, \text{ where } \alpha_o = X/2f \text{ and } \beta_o = Y/2f$$

It follows from the expression for $g_f = (\alpha/\lambda, \beta/\lambda)$ that after the passage of a single plane wave through the lenticular plate there further propagates an infinite number of energy-carrying plane waves. The direction of their propagation in space is determined by the direction cosines $\alpha$ and $\beta$. The values of the direction cosines are limited by $\alpha_o$ and $\beta_o$. This is equivalent to an infinite number of light beams of parallel rays filling the solid angle whose boundaries in the rectangular coordinates are the angles $-\arccos \alpha_o$, $+\arccos \alpha_o$ in one direction, and $-\arccos \beta_o$, $+\arccos \beta_o$, respectively, in the opposite direction.

It is clear now that the light effect of a device, which comprises a laser 1 (FIG. 1) emitting a light beam 2 of parallel rays, and a lenticular plate, is equivalent to that of an infinitely remote extended source of light. Due to the fact that the multitude of light waves originates from one wave, the time difference of phases is a constant value.

Thus, the proposed device is an equivalent of a linearly extended source of coherent light.

The device for coherent lighting of objects, which comprises the laser 1 (FIG. 1), lenticular plate, focusing lens 6 and condenser, operates as the one described above.

This device differs from the one described above in that the infinite number of coherent light beams 3 of parallel rays propagating after the lenticular plate makes it possible to illuminate from all sides every point of an object which is found in an ideal plane, whereas the focusing lens 6 produces an image of that plane in its back focal plane. Each point of the object 5 placed in the back focal plane of the focusing lens 6 is illuminated from all sides by coherent light.

The device for coherent lighting of objects, which comprises the laser 1 (FIG. 4), lenticular plate, cardioid condenser 7 and two coaxial cones 8 and 9 with reflecting surfaces 10 and 11 (FIG. 5), operates as the one described above.

This latter device is characterized by the necessity to fill the annular pupil of the cardioid condenser 7 with all the light beams of parallel rays propagating after the lenticular plate. The presence of the coaxial cones 8 (FIG. 4) and 9 with the reflecting surfaces 10 (FIG. 5) and 11 results in the fact that the continuous cylindrical light beam 2 of parallel rays, which is incident on the cone 8 (FIG. 4), is transformed, after being reflected from the cone 9, into a hollow cylindrical light beam of parallel rays (cf. Applied Optics/vol. 12, No. 8/, Aug. 1973, W. R. Edmonds, "The Reflaxicon, a New Reflective Optical Element, and Some Applications").

Let us omit the elementary calculations and neglect reflection losses. The effect of the reflecting conical surface is expressed by the function $T_k(x, y)$, where, to an accuracy of the constant phase factor, $$T_k(x,y) = \exp[jk(c_k/a_k-1)\sqrt{x^2+y^2}],$$

$c_k$ and $a_k$ being constant defining geometrical characteristics of the conical surface.

Let it again be assumed that $g_o(x, y)$ is the amplitude distribution function of the incident radiation emitted by the laser 1 in the plane XOY which is perpendicular to the axis of the cone 8 passing through its vertex. The amplitude distribution of the radiation field after two reflections from the conical surfaces 10 (FIG. 5) and 11 of the cones 8 (FIG. 4) and 9 in the plane which is perpendicular to their common axis is expressed, to an accuracy of the constant phase factor, by the function $$g_1(x_1,y_1) = g_o(x,y)D_k(x_1,y_1)T_{k1}(x,y)\cdot T_{k2}(x,y),$$

where $D_k(x_1, y_1)$ is the pupil function of the system of the two coaxial cones 8 and 9;

$$D_k(x_1,y_1) = \begin{cases} 1 \dfrac{D_1^2}{y} \leq (x_1^2 + y_1^2) \leq \dfrac{D_2^2}{y} \\ 0 \text{ at all the remaining points;} \end{cases}$$

$D_1$, $D_2$ are the internal and external diameters, respectively, of the pupil of the cone 9;
$T_{k1}(x, y)$, $T_{k2}(x, y)$ are the functions characterizing the effect of the reflecting surfaces 10 (FIG. 5) and 11 of the cones 8 (FIG. 4) and 9, respectively.

If the cones are circular, $c_{k1} = a_{k1}$, $c_{k2} = a_{k2}$; hence, $T_{k1}(x, y) = 1$, $T_{k2}(x, y) = 1$. Consequently, $g_1(x_1, y_1) = g_o(x, y) D_k(x_1, y_1)$.

This means that the field of the radiation, which is incident on the lenticular plate has the same amplitude distribution as in the absence of the cones 8 and 9.

This, in turn, means that the effect of the lenticular sceen, when a hollow light beam is incident thereon, is identical with the effect in the case of the light beam 2.

The device for coherent lighting of objects, which comprises the laser 1 (FIG. 6), lenticular plate 4 cardioid condenser 7, two coaxial cones 8 and 9 with reflecting conical surfaces 10 (FIG. 5) and 11, and plano-convex field lens 13 (FIG. 6) with toroidal convex surface, operates as those described above.

The latter device is characterized in that the complete filling of the entrance pupil of the cardioid condenser 7 with all the light beams 3 of parallel rays, without cutting them off, requires matching the apertures of the lenticular plate and the cardioid condenser 7.

The back focal plane of the lenticular plate is matched with the main front plane of the field lens whose back focal plane is matched with the entrance pupil of the cardioid condenser 7. FIG. 7 shows the way the beams pass through the lenticular plate and field lens, when the annular entrance pupil of the cardioid condenser 7 is completely filled with the light beams.

The proposed device for coherent lighting of objects provides for coherent lighting from all sides of every point of an object being investigated.

The use of this device in image-producing optical instruments ensures a high-quality image without any contrast losses, which makes it possible to work both with high-contrast and minimum contrast objects.

An experimental version of the device in accordance with the invention accounted for a contrast of 0.5 of an image of an object whose contrast, when illuminated by incoherent light, was only 0.2.

The proposed device can be employed as an independent unit to be used in conjunction with a number of optical instruments, including microscopes, phototelegraphic apparatus, and projection devices.

The device of the present invention can be used both in newly developed and conventional equipment.

What is claimed is:

1. A device for coherent lighting of objects, comprising: a laser which emits a coherent light beam of parallel rays along a predetermined optical axis; a light beam transforming means for transforming said coherent light beam of parallel rays, emitted by said laser, into an infinite number of parallel-ray light beams travelling at an angle to one another, said light beam transforming means being arranged along said optical axis across the path of said light beam emitted by said laser, and condenser means situated along said optical axis at the side of said light-beam transforming means opposite from said laser for receiving said infinite number of light beams from said light beam transforming means and for directing the thus-received light beams to an object situated along said optical axis beyond said condenser means at the side thereof opposite from said light beam transforming means for illuminating said object, inner and outer annular coaxial reflecting means arranged along said optical axis across the path of said light beam, between said laser and said light beam transforming means, said inner and outer reflecting means respectively including annular reflecting surfaces each of which forms at least part of a cone whose axis coincides with said optical axis and whose vertex is pointed toward said laser away from said light beam transforming means, said inner reflecting means receiving light from said laser and directing the latter light radially away from the optical axis and said outer reflecting means receiving the light from said inner reflecting means and redirecting the same along a cylinder which coaxially surrounds said optical axis, thus forming a cylindrical beam of light received by said light beam transforming means and transmitted by the latter to said condenser means.

2. A device as claimed in claim 1, comprising a field lens arranged across the path of light beams, between said light beam transforming means and said condenser means.

3. A device as claimed in claim 1, wherein said inner and outer reflecting means are respectively formed by inner and outer reflecting prisms, said inner reflecting prism having an exterior conical reflecting surface while said outer reflecting prism has an interior reflecting surface forming part of a cone.

4. A device as claimed in claim 1, wherein said light beam transforming means is of an annular configuration while said condenser means is in the form of a cardioid condenser.

5. A device as claimed in claim 2, wherein said light beam transforming means is of an annular configuration and coaxially surrounds the optical axis while being situated in the path of the cylindrical beam of light, said condenser means being in the form of a cardioid condenser, and said field lens also being of an annular configuration.

* * * * *